United States Patent [19]

Blanton

[11] 4,150,687
[45] Apr. 24, 1979

[54] WELL PILOT VALVE ASSEMBLY

[76] Inventor: James R. Blanton, 2300 Westbrook, Carrollton, Tex. 75006

[21] Appl. No.: 796,055

[22] Filed: May 12, 1977

[51] Int. Cl.² ............................................ F16K 17/00
[52] U.S. Cl. .................................... 137/458; 137/491; 137/625.6
[58] Field of Search ...................... 137/458, 625.6, 491

[56] References Cited

U.S. PATENT DOCUMENTS

| | | | |
|---|---|---|---|
| 2,327,055 | 8/1943 | McMahon | 137/458 |
| 3,161,207 | 12/1964 | McCarvell | 137/458 X |
| 3,198,207 | 8/1965 | Willis | 137/458 |
| 3,805,837 | 4/1974 | Stampeli | 137/625.6 |
| 3,878,863 | 4/1975 | Snyder | 137/458 X |
| 4,017,053 | 4/1977 | Wells | 137/458 X |

Primary Examiner—Harold W. Weakley
Attorney, Agent, or Firm—Kenneth R. Glaser

[57] ABSTRACT

Disclosed is a pilot valve assembly for preferred use in conjunction with pneumatically operated safety valves of a well head assembly, the pilot valve apparatus including an automatic trip assembly composed of a pair of bourdon tubes adapted to engage respective thumbwheels on a translatable stem; a seal carrier assembly responsively translated between first and second blocking and non-blocking positions between entrance and exit ports; a reset valve assembly for placing the pilot apparatus in its initial "untripped" position; and a manually operated trip valve assembly for independently translating the seal carrier assembly.

13 Claims, 10 Drawing Figures

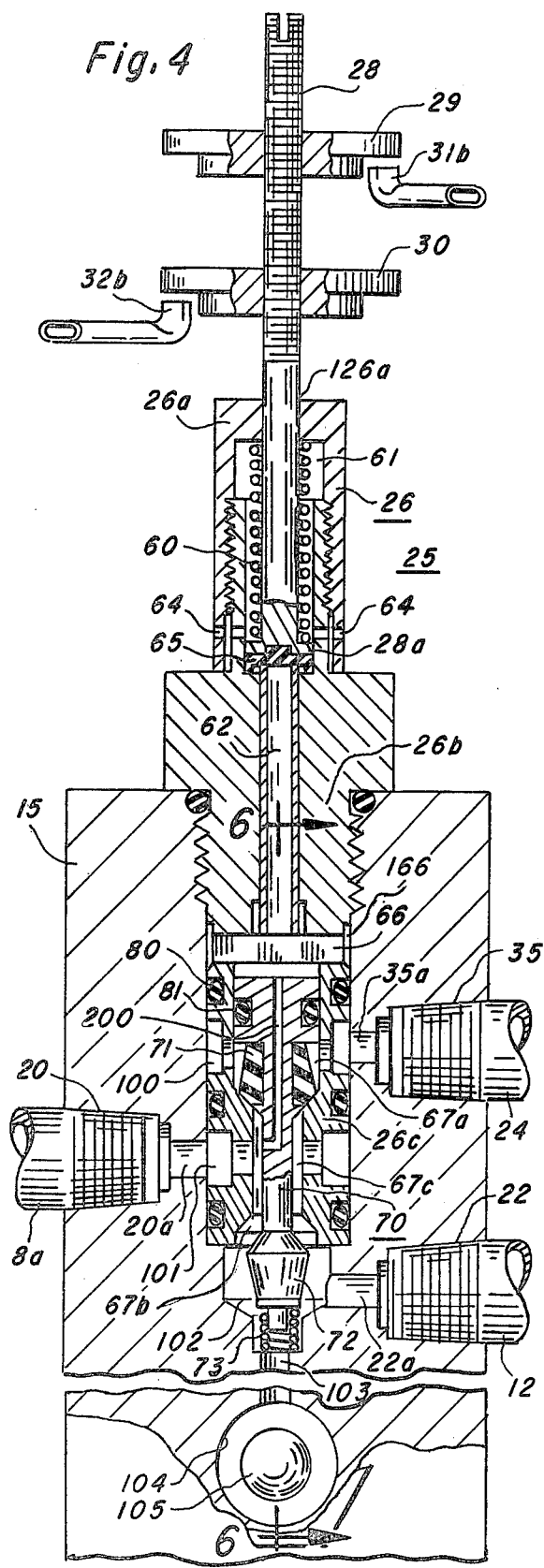
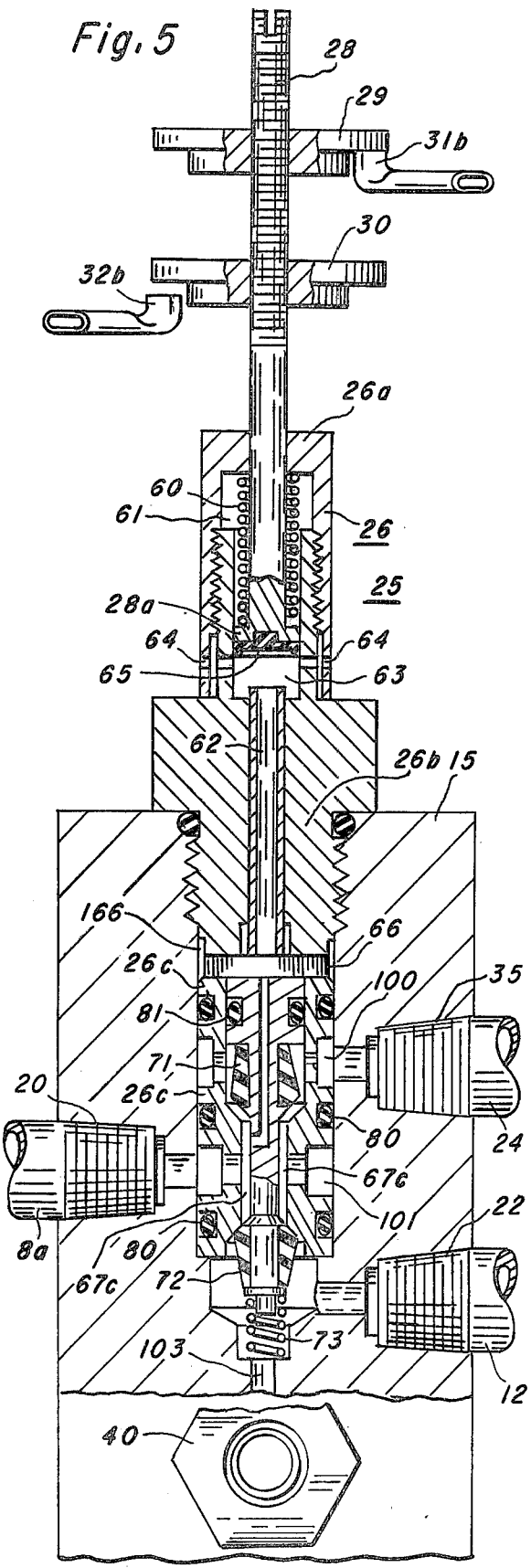

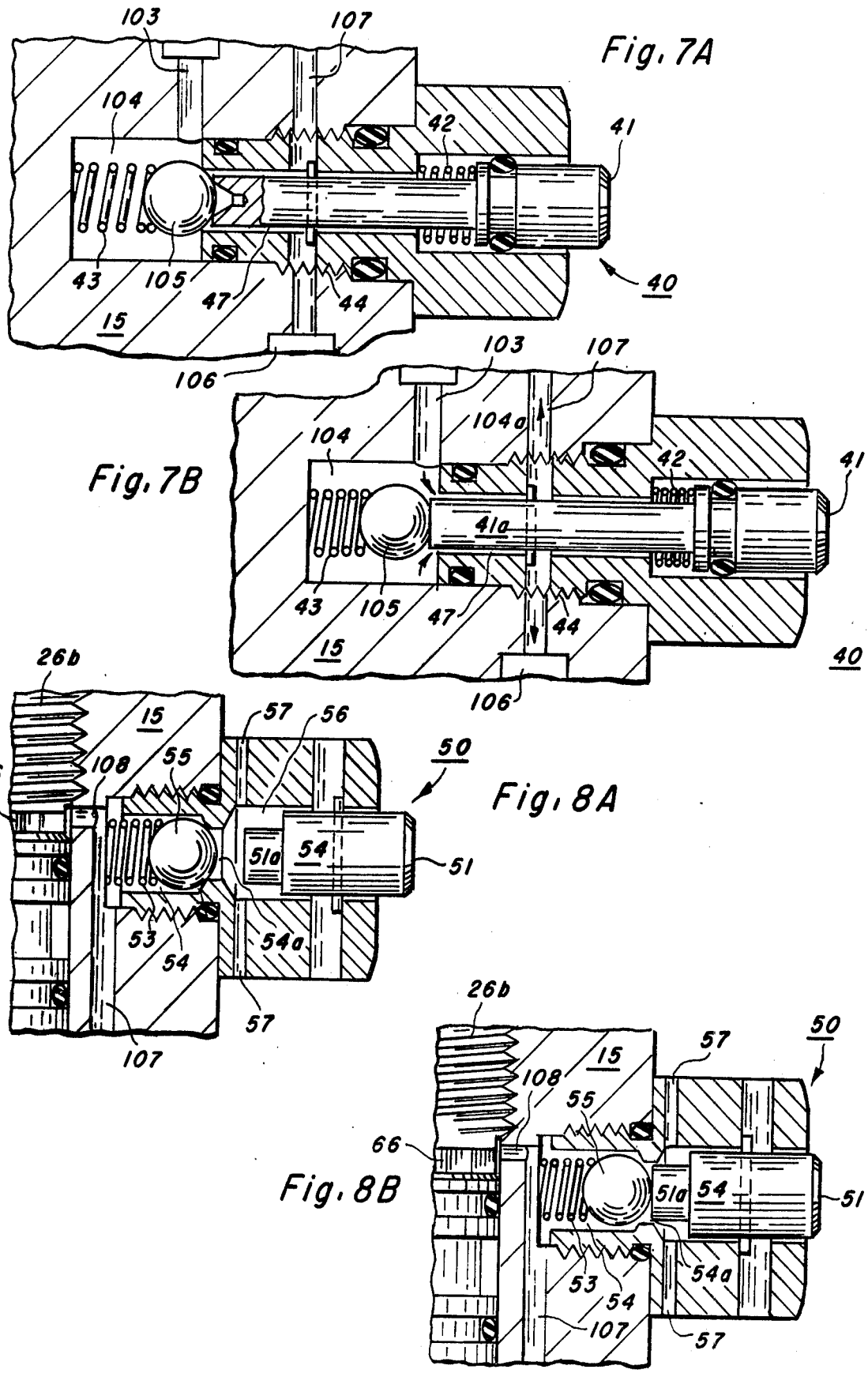

WELL PILOT VALVE ASSEMBLY

This invention broadly relates to fluid valve assemblies, more particularly to pilot valve apparatus for well head assemblies, and even more particularly to a new and improved design of a well pilot valve assembly for interrupting production flow through a well head in response to excessive or insufficient production fluid pressure.

There are many applications where it is necessary to automatically regulate and control fluid flow through a conduit in response to the fluid pressure therein. For example, in well systems, particularly oil and gas wells, it is desirable, if not critical, that the pipe line pressure be maintained within a particular operating range; and that means be provided to terminate production flow through the pipe line whenever the fluid pressure within the pipe line either exceeds or drops below this operating range.

As a consequence, well head assemblies have typically included pneumatically operated gate safety valves which are opened and closed under the control of a fluid pressure sensing device, commonly referred to as a pilot valve, automatically responsive to either an excessive or insufficient fluid pressure within the production pipe line. While various types of these pilot valves are presently in use, the existing designs have not been entirely satisfactory for all conditions of service.

It is therefore a principal object of the present invention to provide a new and improved pilot valve assembly.

It is another object of the invention to provide, in combination with a well head assembly, a pilot valve which more effectively responds to the existence of excessive or insufficient fluid pressure within the production flow line to terminate production flow through the well head assembly.

It is a still further object of the invention to provide a new and improved well pilot valve assembly which is relatively inexpensive to fabricate, is efficient in operation, and which employs an optimum number of component parts in its assembly.

It is an even further object of the invention to provide new improved control apparatus responsive to the pressure of a fluid flowing in a line for terminating said fluid flow when the fluid pressure in the line is outside of a desired operating range.

In accordance with these and other objects, the pilot valve of the present invention is adapted for direct fluid coupling with, and for sensing the fluid pressure within, the production pipe line, the pilot valve including an improved automatic trip valve assembly for effectively and quickly translating a seal carrier assembly between an initial "untripped" position (whereby a control gas is supplied through the pilot valve to sustain a minimum threshold pressure in the control lines to the well head safety valves) and a "tripped" position (whereby the pressure in said control lines are exhausted through the pilot valve to close the safety valves) whenever the fluid pressure within the production pipe line is out of the desired operating range (either excessive or insufficient pressure). In accordance with a unique feature of the invention, the translation of the seal carrier assembly between the untripped and tripped positions is effected in response to the respective expansion and contraction of either one of a pair of "high pressure" or "low pressure" bourdon tubes forming a part of the automatic trip valve assembly. The pilot valve assembly also includes uniquely designed reset valve and manually operated trip valve assemblies for effecting the required operation.

Specific features of the pilot valve assembly of the present invention, as well as additional objects and advantages thereof, will become more readily understood and apparent from the following detailed description of a preferred embodiment of the invention, taken in conjunction with the accompanying drawings, in which:

FIG. 4 is a fragmentary view, partially in section, of the pilot valve, illustrating the details and operation of the automatic trip valve assembly in its "untripped" condition;

FIG. 5 is a view similar to that of FIG. 4 showing the pertinent portions of the automatic trip valve assembly in its "tripped" condition;

FIGS. 7A and 7B depict a portion of the reset valve assembly respectively illustrating its operation between the "closed" and "open" condition; and FIGS. 8A and 8B depict a portion of the manually operated trip valve assembly respectively illustrating its operation between the "closed" and "open" condition.

The drawings are not necessarily to scale and in some instances portions have been exaggerated in order to more clearly depict certain features of the present invention.

Figure 1:
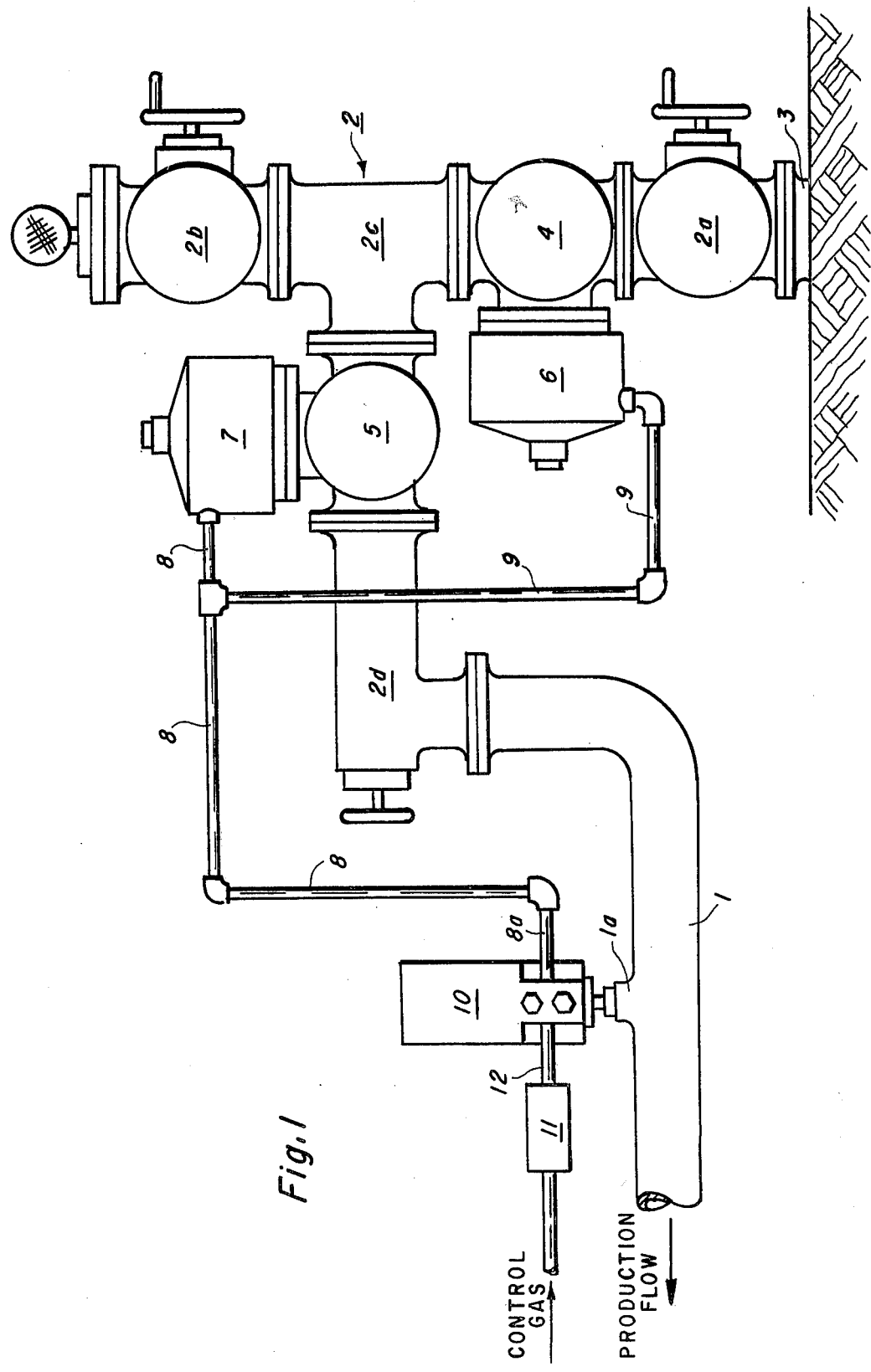
FIG. 1 is a schematic illustration of a well head assembly in combination with the pilot valve of the present invention.

Referring initially to FIG. 1, a well head assembly for an oil or gas well, and of the type generally known in the art as a Christmas tree, is broadly depicted by the reference numeral 2 and is connected intermediate the well casing 3 and the production flow line or pipe 1 extending therefrom. The well head assembly 2 conventionally includes respective master and tubing access valve assemblies 2a and 2b; T-fitting 2c; and a flow choke housing 2d connected with the production flow pipe 1.

Disposed intermediate the assemblies 2a and 2c is a safety valve 4 pneumatically actuated under control of an operatively associated control cylinder assembly 6; and disposed intermediate the assemblies 2c and 2d is a safety valve 5 pneumatically actuated by an operatively associated control cylinder assembly 7. The safety valves 4 and 5 are gate valves respectively opened and closed to either enable or terminate fluid (oil or gas) flow from the well casing through the production pipeline. In accordance with a preferred form thereof, the safety valves 4 and 5 are of the normally closed type which are held open by control cylinders 6 and 7 in response to a gas pressure within conduits 8 and 9 exceeding a minimum threshold value, the valves 4 and 5 closing whenever such pressure drops below this threshold value.

The regulation or control of the fluid pressure within conduits 8 and 9 is effected by the pilot valve assembly of the present invention broadly depicted in FIG. 1 by the reference numeral 10 and which is operatively connected (by way of internally threaded coupling means 1a) with the flow pipe 1 and (by way of conduit section 8a) with conduit 8. A control gas (from a gas supply not shown), the pressure of which is regulated by a standard pressure regulator 11, flows into the pilot valve assembly 10 through the conduit 12. As subsequently described in greater detail, the pilot valve assembly 10 is effective to transmit the pressure regulated control gas through the assembly to supply the requisite threshold fluid (gas) pressure within the conduits 8 and 9 (thereby maintaining the gate valves 4 and 5 in their open position) during normal well operating conditions, and to interrupt such control gas flow as well as exhausting the pressure within lines 8 and 9 below such threshold value (thereby closing valves 4 and 5 to shut in the well) whenever the flow line pressure within production pipe 1 is out of the desired operating range (either excessive or insufficient pressure).

Figure 2:
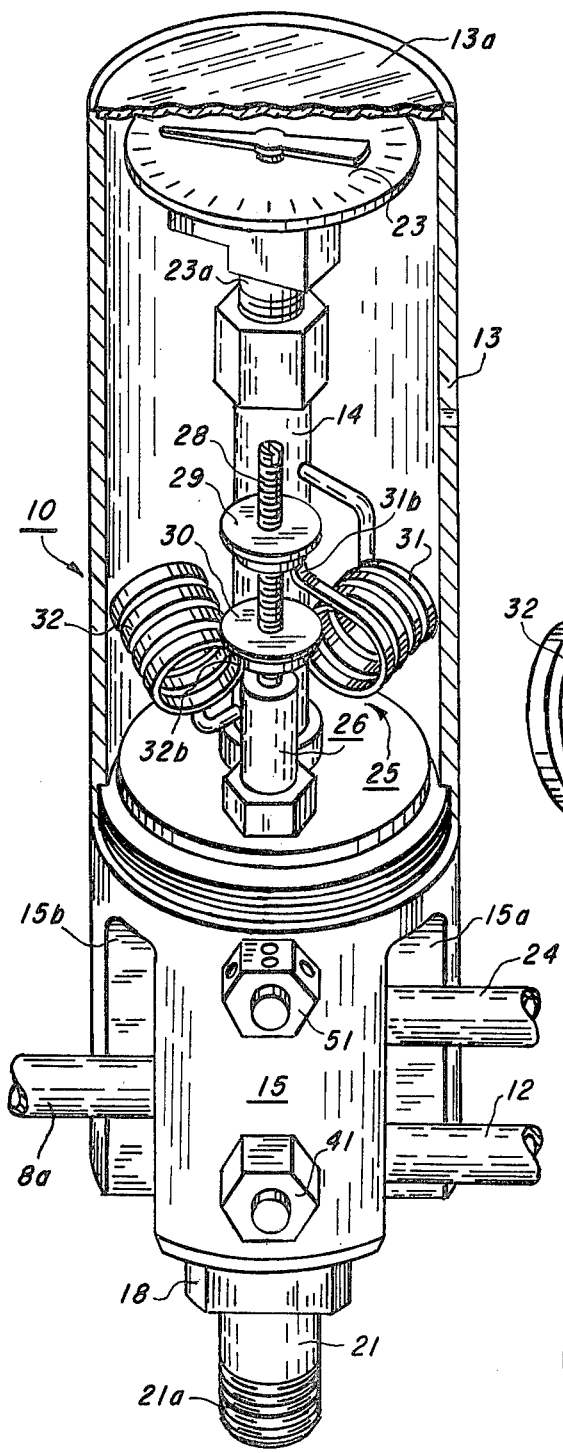
FIG. 2 is a perspective view of the pilot valve assembly of the present invention with portions of the casing removed for convenient viewing thereof.
Figure 3:
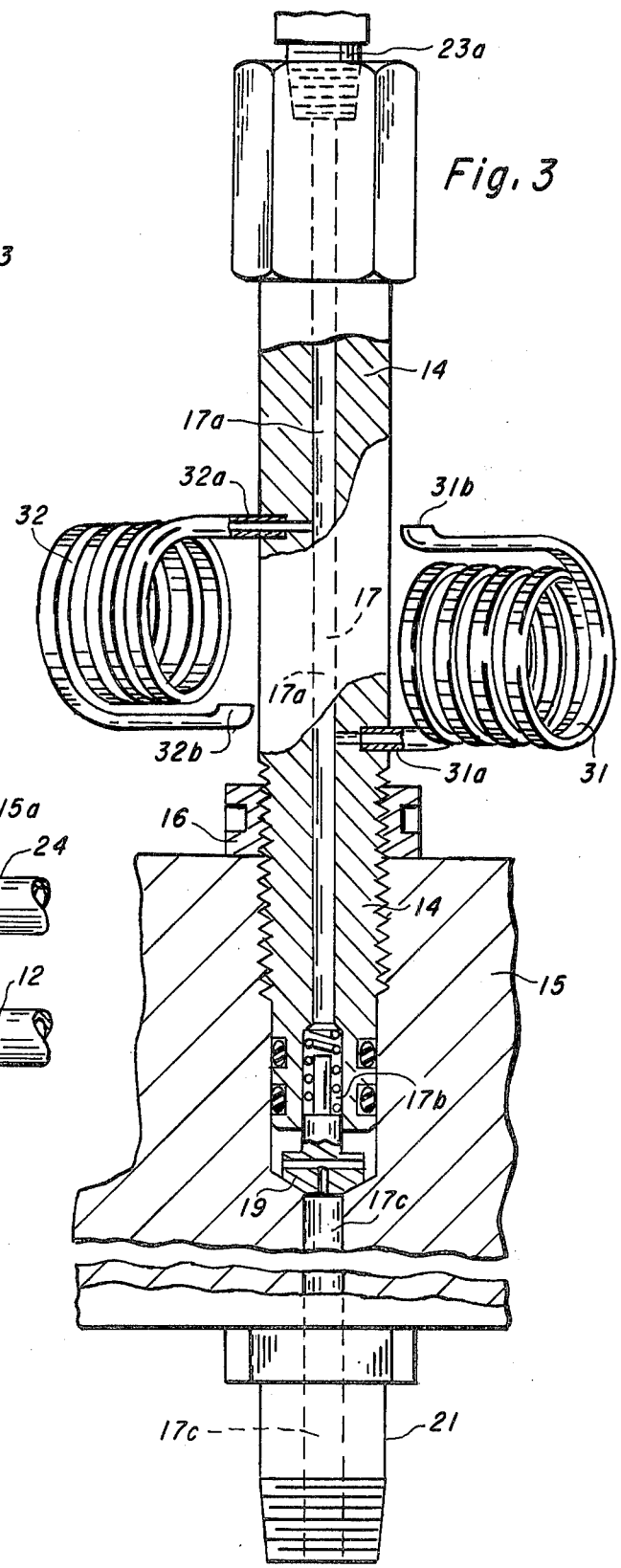
FIG. 3 is a fragmentary view, partially in section, of the pilot valve assembly, illustrating the interconnection of the bourdon tubes for sensing the fluid pressure within the production pipe line.

Referring now to FIGS. 2 and 3, and with initial reference to FIG. 2, the pilot valve assembly 10 comprises a main cylindrical body portion 15 with an upwardly extending casing portion 13 which serves to enclose (and thereby protect) the subsequently described bourdon tube - thumbwheel assemblies and pressure gage 23. A transparent plate 13a closes off the enclosure 13 and enables viewing of the pressure readings on gage 23. An elongated tubular member 14 is threadably joined (FIG. 3) at its base with the main body 15 (and secured thereto by lock ring 16). Joined with the main body 15, and extending downwardly therefrom, is a pipe-like extension 21 externally threaded at 21a to enable threadable connection within the coupler 1a of the main pipe line 1. A wrench flat 18 is provided around extension 21 to facilitate this connection and thereby the connection of the entire pilot valve assembly with the production pipe line.

Axially extending through the member 14, body 15, and extension 21 is a bore 17 defined by an upper elongated channel 17a, an intermediate passageway 17b, and a lower elongated channel 17c, all in fluid communication with one another. Thus, when the assembly 10 is connected, as previously described, with the production pipe line 1, the fluid pressure within the bore 17 approximates that within the pipe line. If desired, a conventional poppet or velocity check valve 19 can be disposed within passageway 17b.

A conventional pressure gage 23 (FIG. 2) senses and displays the pressure within the bore 17 (and thus within the pipe line 1), the pressure gage being threadably joined (by way of channeled stem 23a) at the top of tube 14.

As subsequently described in greater detail, the pilot valve 10 comprises an automatic trip valve assembly 25 (the main housing 26 of which is depicted in FIG. 2) for interrupting the control gas flow from conduit 12 and exhausting the pressure in conduit 8a (and thus lines 8 and 9) through an exhaust port (and communicating exhaust conduit 24) in response to excessive or insufficient pressure within pipe line 1; a manually operated trip valve assembly 50 (the actuating button assembly 51 being depicted in FIG. 2); and a reset valve assembly 40 (the actuator button assembly 41 being depicted in FIG. 2) for resetting the pilot valve 1 to its initial or normal operating condition.

A pair of cut-outs 15a and 15b are provided in the main body 15 to enable passageways for the connection of the conduits 8a, 12, and 24 within the respective fluid ports 20, 22, and 35 (FIGS. 4 and 5) of the body 15. Thus, and as subsequently described in greater detail, each of the conduits 8a, 12, and 24 are in fluid communication with the interior chamber of the automatic trip valve assembly housing 26.

The trip valve assembly 25 includes a stem 28 (FIGS. 2, 4 and 5) mounted for vertical translation within the housing 26, a pair of thumbwheels 29 and 30 being threadably adjustably secured with the stem 28. In accordance with the subsequently described operation, these thumbwheels (and consequently the stem 28) are respectively elevated in response to the respective expansion and contraction of either one of a pair of bourdon tubes 31 and 32. As best depicted in FIG. 3, each of the bourdon tubes has respective open end portions 31a and 32a in fluid communication with the interior of upper channel 17a, each of the tubes 31 and 32 being wound in respectively opposite directions so that an increase in pressure within bore 17 (representative of increasing pressure within pipe line 1) elevates the free end portion 31b (of "high" pressure bourdon tube 31); and a decrease of pressure within channel 17a (representing falling pressure in the pipe line) elevates the free end 32b (of the "low" pressure bourdon tube 32). As observed in FIG. 2, for example, the free end portions 31b and 32b are respectively situated immediately adjacent the underside of thumbwheels 29 and 30, so that sufficient elevation of either of these end portions engages the associated thumbwheel to raise the stem 28.

With principal reference to FIGS. 4 and 5, the details and operation of the automatic trip valve assembly 25 are now described. Accordingly, the upper portion 26a of the trip valve assembly main housing 26 defines a longitudinally extending chamber 61 through which the valve stem 28 axially extends, the valve stem being mounted for vertical translation within an opening 126a in the top of housing portion 26a. Disposed around the valve stem 28, and within the chamber 61, is a compression spring 60. The base of the spring 60 is supported at the top of an enlarged diameter shoulder portion 28a at the base of the valve stem, the top of the spring 60 being retained against the interior horizontally extending wall of the upper portion 26a adjacent opening 126a. Thus, the spring 60 is effective to normally urge the valve stem 28 axially downward.

The main housing 26 also includes an intermediate portion 26b threadably joined with the body 15 and having an axially extending bore 62 which, at its top, is in fluid communication with the base of chamber 61 (depicted in FIG. 5 as chamber 63) beneath the valve stem 28 and, at its bottom, is in fluid communication with a transversely extending channel 66. Transversely intersecting the chamber portion 63 are a pair of exhaust ports 64 open to the atmosphere through the wall of housing portion 26a.

In accordance with a unique feature hereof, the lower surface of the valve stem base 28a is recessed for retention of a stem seal 65 preferably formed of a Teflon material. Thus, when the valve stem 28 is biased by spring 60 to its lowermost position (shown in FIG. 4), the stem seal 65 is firmly seated against, and is effective to seal off, the top of the bore 62.

The valve housing 26 also includes a lower housing portion 26c defining therein a main chamber 67 comprised of upper and lower chamber portions 67a and 67b joined by an axially extending, narrow channel portion 67c. Below chamber 67 (particularly 67b) is an enlarged chamber 102 which is in fluid communication with a vertically extending channel 103, the channel 103 also being in fluid communication (FIG. 6) with a vertically extending channel 107 by way of reset valve assembly 40. The channel 107 is in fluid communication with the transverse channel 66 by way of laterally extending port 108 and communicating annular clearance 166.

A threaded port 20 (in which conduit 8a is interfitted) communicates by way of channel 20a with an annular port 101 which is in fluid communication with channel portion 67c. Threaded exhaust port 35 (in which conduit 24 is interfitted) communicates by way of channel 35a with annular port 100 which is in fluid communication with upper chamber portion 67a. Threaded port 22 (in which conduit 12 is interfitted) communicates by way of channel 22a with chamber 102. O-rings 80 are effective to isolate chamber 66, ports 100 and 101, and chamber 102 from one another; and O-ring 81 is designed to isolate fluid chambers 66 and 67a from one another.

Mounted for vertical translation within the chamber 67 is a poppet seal carrier assembly 70 supporting upper and lower poppet seals 71 and 72. Disposed at the base of the carrier assembly 70 is a spring 73 normally biasing the carrier assembly 70 in an upward direction. When the trip valve assembly 25 is in its "untripped" position (position shown in FIG. 4), this spring pressure is effectively counteracted by the pressure of the gas from the conduit 12 which enters channel 103, flows through the assembly 40 (as subsequently described) to channel 107 where it flows through port 108, clearance 166, to channel 66 where it then acts upon the top of carrier assembly 70 to maintain this assembly in its lowermost position. It is also to be noted that a channel 200 extends through carrier assembly 70 establishing fluid communication between chamber portion 67c and that portion of the chamber over the top of carrier 70. Thus, gas entering chamber 67c from port 22 also provides pressure to retain carrier assembly 70 on its lowermost position in the event of any gas leakage past the O-rings.

When the poppet seal carrier assembly 70 is in its lowermost position (FIG. 4), the lower seal 72 is unseated and flow communication is established between the control gas entrance port 22 and the exit port 20, the upper seal 71 being seated firmly to block chamber 67a from channel 67c. Thus, control gas from the conduit 12 flows through the chamber portions 67b and 67c into the annular port 101 and thereafter through the exit port 20 and out the conduit 8a to establish the minimum threshold pressure within the conduits 8 and 9 (thereby maintaining the safety valves 4 and 5 in their open position).

On the other hand, when the trip valve assembly 25 is in its "tripped" position (FIG. 5) and the seal carrier assembly 70 has been elevated toward its uppermost position (in accordance with the operation subsequently described) the upper seal 71 is unseated and fluid communication is established between the port 20 and exhaust port 35. Lower seal 72 is now firmly seated and the flow of control gas from chamber 67b into channel 67c is effectively blocked by the lower seal 72. As a consequence, the pressure within conduit 8 (and 9) is exhausted through the conduit 24, thus reducing the pressure within the lines 8 and 9 below the minimum threshold valve, and allowing safety valves 4 and 5 to close (thereby shutting off well production through the pipe line 1).

Figure 6:
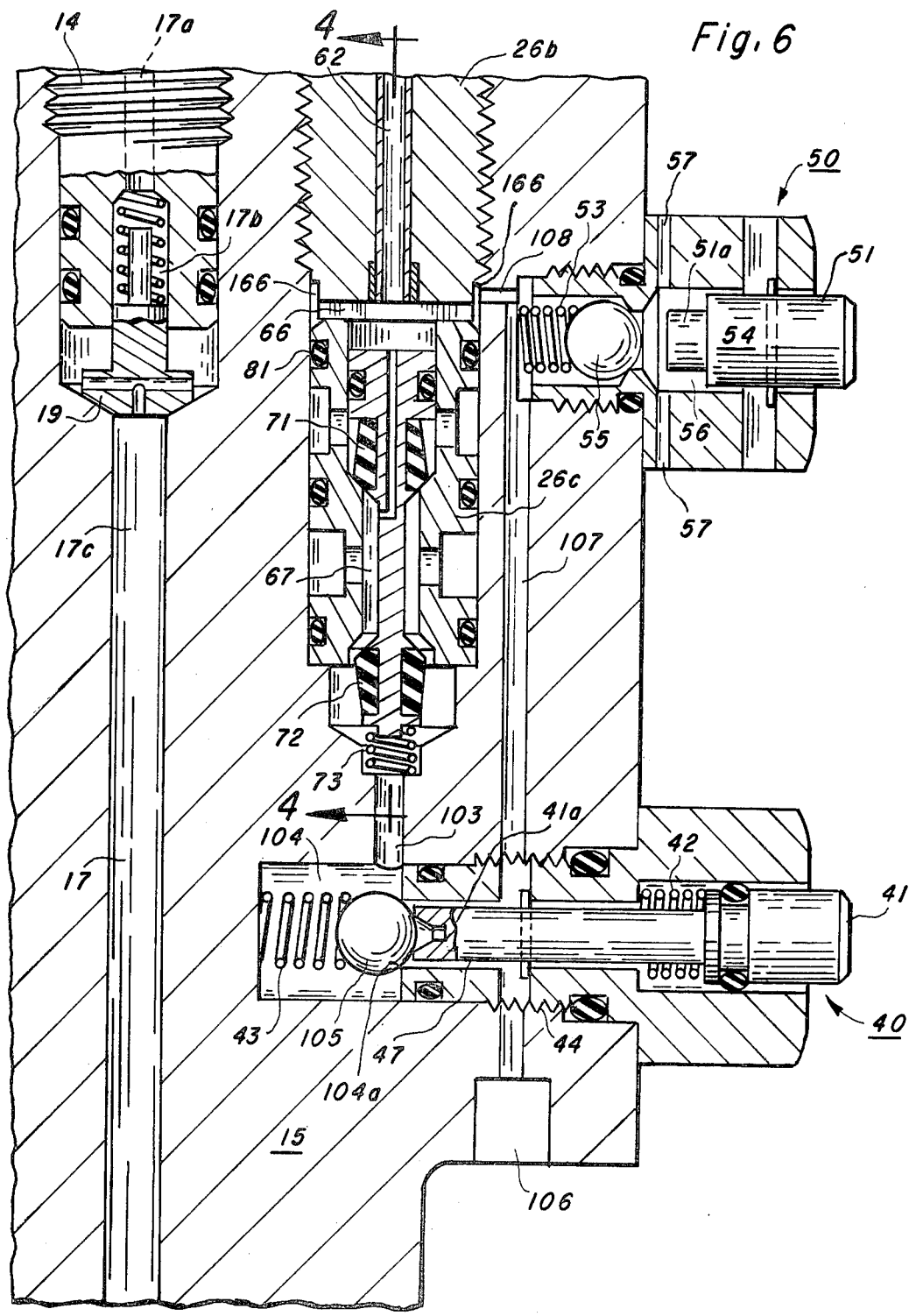
FIG. 6 is a fragmentary view, partially in section, of the pilot valve, illustrating the details of the reset valve assembly and manually operated trip valve assembly and their respective relationship with a portion of the automatic trip valve assembly, the illustration of FIG. 6 taken along the section lines 6—6 of FIG. 4.

Referring now to FIGS. 6, 7A and 7B, the details and operation of the reset valve assembly 40 is described. Accordingly, the assembly 40 has its main body portion threadably connected at 44 with the pilot valve assembly main body 15. A rear chamber 104 is in fluid communication with the vertically extending channel 103, but is normally isolated from the remainder of the assembly 40 (and vertical channel 107) by a ball seal 105 seated within the opening 104a by spring 43. The base of channel 107 is effectively sealed off by a plug 106. Axially disposed through the assembly 40, and terminating immediately adjacent the right side of ball seal 105, is a plunger 41a which is normally biased by spring 42 away from the ball seal 105. Thus, when the assembly 40 is in its normally closed position (position depicted in FIG. 7A), the gas (from conduit 12) is prevented from exiting the chamber 104 through the opening 104a.

Depression of the button 41 (FIG. 7B) is effective to translate the plunger 41a to unseat the ball seal 105, thus opening the reset valve assembly 40 (position shown in FIG. 7B) to enable the control gas within the chamber 104 to flow through the opening 104a, around annular space 47, past the threads 44, and into the vertical channel 107 where it subsequently flows through opening 108 into the transverse chamber 66. Release of the button 41 then enables the ball seal 105 to be spring biased to its original seated position within opening 104a and the assembly to be returned to the closed condition shown in FIG. 7A.

The overall operation of the pilot valve assembly 10, and particularly the automatic trip valve assembly 25, is now described. Accordingly, the assembly is initially "calibrated" by appropriately positioning the thumbwheels 29 and 30 in accordance with the allowable operating pressure range within the pipe line 1. Specifically, the relative spacing of the thumbwheel 29 over and from the free end 31b of the bourdon tube 31 sets the "high" point of this allowable pressure range, while the relative spacing of the thumbwheel 30 over and from the free end 32b of the bourdon tube 32 sets the "low" point of this pressure range.

The button 41 of the reset valve assembly 40 is initially depressed, thus enabling the control gas from the conduit 12 (which has entered the chamber 104 through channel 103) to flow through the opening 104a into the assembly 40 (as previously described), into the channel 107, and thereafter into the transverse chamber 66 to force the poppet seal carrier assembly 70 to the lowermost position depicted in FIG. 4. At this time, the valve stem 28 is also at its lowermost position depicted in FIG. 4 with the valve stem seal 65 being firmly seated to close off the bore 62. Assuming that the pressure within the pipe line 1 is within the allowable pressure range, the control gas entering the conduit 12 flows through the port 20 into the conduit 8a (the reset valve assembly having been returned to its original "closed" position of FIG. 7A) with the resulting pressure in lines 8 and 9 maintaining the safety valves 4 and 5 in their "open" position to enable normal production flow through the pipe line 1.

When the pressure within the pipe line 1 either increases above, or falls below, the desired operating range, the resulting expansion of either bourdon tube 31 or contraction of bourdon tube 32, as the case may be, causes the engagement of the free end (31b or 32b) of the respective bourdon tube with its associated thumbwheel (29 or 30), thus lifting the valve stem 28 to unseat the valve stem seal 65. For convenience of this description, FIG. 5 depicts the engagement of the thumbwheel 29 (indicating excessive pressure within the line 1); but it is to be understood that the remainder of the following description is equally applicable if the lower thumbwheel 30 had been engaged (thus indicating insufficient pressure within line 1).

As a consequence of the aforementioned mechanical lifting of the valve stem 28, the valve stem seal 65 is unseated (FIG. 5) and pressure within the bore 62 is now free to act against the total lower surface of the seal 65, thus accelerating the upward travel of the stem and seal until the exhaust ports 64 are exposed. At this point, the gas within the bore 62 is free to flow through the exhaust ports 64, thereby almost instantaneously reducing the downward pressure acting against the poppet seal carrier assembly 70, the pressure of the spring 73 (as well as pressure from conduit 8a) now being effective to rapidly translate the carrier assembly 70 upward to elevate the seals 71 and 72 to the positions shown in FIG. 5.

As a consequence, and as previously described, the control gas from conduit 12 is effectively prevented from entering the chamber 67, and the now-existing fluid communication between ports 20 and 35 exhausts the gas pressure from conduit 8a (by way of the chamber 67) through the conduit 24, resulting in the decrease of pressure within lines 8 and 9 below the minimum threshold value. As a result, the safety valves 4 and 5 will close and production flow through the pipe line 1 cease until normal operating conditions are restored and the pilot valve assembly 10 is reset to its original condition.

In addition to the automatic tripping of the pilot valve assembly, as previously described, the assembly 10 can be manually tripped by the operation of trip valve assembly 50 in order to close safety valves 4 and 5. Accordingly, and with reference now to FIGS. 6, 8A and 8B, the details and operation of the manually operated trip valve assembly 50 is described.

Similar to the assembly 40, the trip valve assembly 50 has its main housing threadably connected with the main body 15, a chamber 54 in fluid communication with the channel 107 (and port 108) adapted to be sealed off at the opening 54a by a spring biased ball seal 55. A plunger 51a is mounted for translation within a central chamber 56 so that when the button 51 is depressed, the plunger 51a engages and unseats the seal 55 from the opening 54a. Exhaust ports 57 are provided in the main housing in fluid communication with the central chamber 56. Means (not shown) may be provided for returning the plunger 51a to its rightmost position depicted in FIG. 6.

During normal operation, the valve assembly 50 is in its "closed" position depicted in FIG. 8A. Actuation of the assembly 50 is by depressing the button 51 to translate the plunger 51a to unseat the ball seal 55, thus exhausting the gas pressure from channels 107 and 108 through the exhaust ports 57, as depicted in FIG. 8B. This consequent loss of pressure thus results in the seal carrier assembly 70 being translated, in the manner similar to that previously described, to the position depicted in FIG. 5, thus reducing the pressure in lines 8 and 9 below the minimum threshold value to close safety valves 4 and 5. Restoration of the assembly 10 (and particularly the seal carrier assembly 70) to its original condition is then effected, as before, by actuation of the reset valve assembly 40.

Various modifications to the disclosed embodiment, as well as alternate embodiments of the present invention may become apparent to one skilled in the art without departing from the spirit and scope of the invention as defined by the appended claims.

What is claimed is:

1. In combination with a well head assembly of the type including gate valve means opened and closed to respectively enable and terminate production flow through a flow line connected with said assembly and control means operatively associated with said gate valve means for opening and closing said gate valve means in response to the extent of fluid pressure acting on said control means, a pilot valve assembly for regulating the extent of said fluid pressure acting on said control means in response to the fluid pressure within said production flow line, said pilot valve assembly comprising:

(a) a main body adapted for connection with said production flow line, said main body, when so connected, having an axially extending bore in fluid communication with the interior of said production flow line, (b) a first fluid chamber within said main body; first, second and third ports communicating with said first fluid chamber;

(c) a source of control gas connected with said first port, means for establishing fluid communication between said second port and the control means associated with said gate valve means, said third port being open to the atmosphere;

(d) seal means respectively translated within said first fluid chamber between a first position whereby said first and second ports are in fluid communication with one another through said fluid chamber, but isolated from said third port, and a second position whereby said second and third ports are in fluid communication with one another through said first fluid chamber, but isolated from said first port;

(e) a trip valve assembly main housing defining a second fluid chamber therein, a second axially extending bore establishing fluid communication between said first and second fluid chambers; and (f) tripping means for automatically translating said seal means from said first position to said second position in response to the fluid pressure within said production flow line being above or below a predetermined operating range, said tripping means comprising:

(i) first and second bourdon tubes respectively expanding and contracting in response to increases and decreases of said production flow line pressure, and (ii) translatable means engageable by the respective free ends of said bourdon tubes as a consequence of the increased expansion of the first bourdon tube as well as of the increased contraction of the second bourdon tube, thereby initiating the translation of said seal means from said first position to said second position, said translatable means comprising an elongated stem mounted for axial translation through said second fluid chamber and a pair of thumbwheels adjustably mounted on said stem and positioned immediately adjacent the respective free ends of said first and second bourdon tubes.

2. The pilot valve assembly defined by claim 1 wherein said elongated stem has a cup seal retained within an end thereof for closing off the top of said second axially extending bore.

3. The pilot valve assembly as defined by claim 2 wherein said trip valve assembly main housing includes exhaust port means communicating with said second fluid chamber, said exhaust port means being isolated from said second axially extending bore by said cup seal means when said elongated stem is translated to its lowermost position.

4. The pilot valve assembly apparatus as defined by claim 3 further including first spring means for urging said seal means toward said second position.

5. The pilot valve assembly apparatus as defined by claim 4 further including a reset valve assembly and a fluid path established between said first port and said first fluid chamber by way of said reset valve assembly.

6. The apparatus as defined by claim 5 whereby said reset valve assembly includes means for respectively interrupting and establishing said fluid path.

7. The apparatus as defined by claim 4 further including a manually operated trip valve assembly which, upon actuation, translates said seal means from said first position to said second position.

8. In combination with a well head assembly of the type including gate valve means operable between alternate positions for respectively enabling and terminating production flow through a flow line connected with said assembly and control means operatively associated with said gate valve means for operating said gate valve means between said alternate positions in response to the respective presence or absence of a control fluid of perdetermined pressure acting upon said control means, an improved pilot valve assembly for regulating said control fluid acting upon said control means in response to the fluid pressure within said production flow line, said improved pilot valve assembly comprising:

(a) a main body adapted for connection with said production flow line, said main body, when so connected, having a first fluid passageway in fluid communication with the interior of said production flow line;

(b) a longitudinally extending first fluid chamber defined within said main body; first, second, and third ports communicating with said first fluid chamber;

(c) means for introducing said control fluid into said first port, means for establishing fluid communication between said second port and the control means associated with said gate valve means, said third port being an exhaust port;

(d) seal means translated within, and along the axial direction of, said longitudinally extending first fluid chamber between a first axial position whereby said first and second ports are in fluid communication with one another through said first fluid chamber, but isolated from said third port, and a second axial position whereby said second and third ports are in fluid communication with one another through said first fluid chamber, but isolated from said first port; means establishing a second fluid pressure to act upon said seal means to maintain said seal means at said first axial position, the translation of said seal means to said second axial position being effected in response to the reduction of the second fluid pressure acting upon said seal means; and (e) tripping means for automatically translating said seal means from said first axial position to said second axial position in response to the fluid pressure within said production flow line being above or below a predetermined operating range, said tripping means comprising:

(i) first and second pressure responsive means, each of said pressure responsive means comprising a main body having one end in fluid communication with said first fluid passageway and a free end adapted to move in one direction in response to increasing fluid pressure within said first fluid passageway and in an opposite direction in response to decreasing fluid pressure within said first fluid passageway, (ii) stem means mounted for rectilinear translation between first and second positions and operatively associated with seal means so that the translation of said stem means from said first position to said second position consequently reduces said second fluid pressure and thereby initiates the translation of said seal means from its first axial position to its second axial position, (iii) engageable means associated with said stem means and adapted to be engaged by the free ends of said first and second pressure responsive means for translating said stem means from its first position toward its second position solely in response to the respective increase of the fluid pressure within said production flow line above said predetermined operating range or the decrease of the fluid pressure within said production flow line below said predetermined operating range, the free ends of said first and second pressure responsive means being translatably disengaged from said engageable means when the fluid pressure within said production flow line is within said predetermined operating range, and (iiii) means maintaining said stem means in its first position when the fluid pressure within said production flow line is within said predetermined operating range.

9. In combination with a well head assembly of the type including gate valve means operable between alternate positions for respectively enabling and terminating production flow through a flow line connected with said assembly and control means operatively associated with said gate valve means for operating said gate valve means between said alternate positions in response to the respective presence or absence of a control fluid of predetermined pressure acting upon said control means, an improved pilot valve assembly for regulating said control fluid acting upon said control means in response to the fluid pressure within said production flow line, said improved pilot valve assembly comprising:

(a) a main body adapted for connection with said production flow line, said main body, when so connected, having a first fluid passageway in fluid communication with the interior of said production flow line;

(b) a first fluid chamber within said main body; first, second, and third ports communicating with said first fluid chamber;

(c) means for introducing said control fluid into said first port, means for establishing fluid communication between second port and the control means associated with said gate valve means, said third port being an exhaust port;

(d) seal means respectively translated within said first fluid chamber between a first position whereby said first and second ports are in fluid communication with one another through said first fluid chamber, but isolated from said third port, and a second position whereby said second and third ports are in fluid communication with one another through said first fluid chamber, but isolated from said first port, and (e) tripping means for automatically translating said seal means from said first position to said second position in response to the fluid pressure within said production flow line being above or below a predetermined operating range, said tripping means comprising:

(i) first and second bourdon tube means, each of said bourdon tube means comprising a main body having one end in fluid communication with said first fluid passageway and a free end adapted to move in one direction in response to increasing fluid pressure within said first fluid passageway and in an opposite direction in response to decreasing fluid pressure within said first fluid passageway, (ii) stem means mounted for translation between first and second positions and operatively associated with seal means so that the translation of said stem means from said first position to said second position consequently initiates the translation of said seal means from its first position to its second position, (iii) a pair of thumbwheels adjustably mounted with said stem means and adapted to be respectively engaged by the free ends of said first and second bourdon tubes for translating said stem means from its first position toward its second position solely in response to the respective increase of the fluid pressure within said production flow line above said predetermined operating range or the decrease of the fluid pressure within said production flow line below said predetermined operating range, the free ends of said bourdon tube means being translatably disengaged from said thumbwheels when the fluid pressure within said production flow line is within said predetermined operating range, and (iiii) means maintaining said stem means in its first position when the fluid pressure within said production flow line is within said predetermined operating range.

10. The improved pilot valve assembly as defined by claim 9 further including a second fluid chamber spaced from, but in fluid communication by way of a second fluid passageway with, said first fluid chamber; said second fluid chamber having an exhaust port in communication therewith; said stem means, when in its first position, closing off said second fluid passageway to isolate said first chamber from said second chamber; said stem means, when in its second position, enabling fluid communication between the first fluid chamber and the exhaust port communicating with said second fluid chamber.

11. The improved pilot valve assembly as defined by claim 10 further including means biasing said seal means towards its second position and means for establishing fluid pressure within said first fluid chamber to counteract said biasing means, thereby to maintain said seal means at its first position.

12. The improved pilot valve assembly of claim 11 further including manually operated trip means for exhausting the counteracting fluid pressure from said first fluid chamber.

13. Control apparatus responsive to the pressure of a fluid flowing in a line for terminating said fluid flow when the pressure of said fluid is outside of a desired operating range, said control apparatus comprising:

valve means associated with said line operable between alternate positions for respectively enabling or terminating fluid flow through said line, first control means operatively associated with said valve means for operating said valve means between said alternate positions in response to the respective presence or absence of a control fluid of predetermined pressure acting upon said first control means, a source of said control fluid, and second control means for supplying said control fluid of predetermined pressure to act upon said first control means when the pressure of the fluid within said line is within said desired operating range and for preventing said control fluid of predetermined pressure from acting upon said first control means when the pressure of the fluid within said line is outside of said operating range, said second control means comprising:

(a) a main body having a first fluid passageway in fluid communication with said line;

(b) a first fluid chamber within said main body; first, second, and third ports communicating with said first fluid chamber;

(c) means for introducing said control fluid into said first port, means for establishing fluid communication between said second port and said first control means, said third port being an exhaust port;

(d) seal means respectively translated within said first fluid chamber between a first position whereby said first and second ports are in fluid communication with one another through said first fluid chamber, but isolated from said third port, and a second position whereby said second and third ports are in fluid communication with one another through said first fluid chamber, but isolated from said first port, and (e) tripping means for automatically translating said seal means from said first position to said second position in response to the fluid pressure within said line being outside of said desired operating range, said tripping means comprising:

(i) a pair of bourdon tube means respectively expanding and contracting in response to increasing and decreasing fluid pressure within said first fluid passageway, (ii) stem means mounted for translation between first and second positions and operatively associated with said seal means so that the translation of said stem means from said first position to said second position consequently initiates the translation of said second means from its first position to its second position, (iii) a pair of thumbwheels adjustably mounted with said stem means and adapted to be respectively engaged by the free ends of said bourdon tube means for translating said stem means from its first position toward its second position solely in response to the fluid pressure within said line being outside of said desired operating range, and the free ends of said bourdon tube means being translatably disengaged from said thumbwheels when the fluid pressure within said line is within the desired operating range, (iiii) means maintaining said stem means in its first position when the fluid pressure within said line is within said desired operating range, and (iiiii) a second exhaust port; said stem means, when in its first position, isolating said first fluid chamber from said second exhaust port; said stem means, when in its second position, enabling fluid communication between said first fluid chamber and said second exhaust port.

* * * * *